US008229730B2

(12) United States Patent
Van Den Berg et al.

(10) Patent No.: US 8,229,730 B2
(45) Date of Patent: Jul. 24, 2012

(54) INDEXING ROLE HIERARCHIES FOR WORDS IN A SEARCH INDEX

(75) Inventors: Martin H. Van Den Berg, Palo Alto, CA (US); Giovanni L. Thione, San Francisco, CA (US); Chad P. Walters, San Francisco, CA (US); Richard S. Crouch, Cupertino, CA (US)

(73) Assignee: Microsoft Corporation, Redmond, MA (US)

( * ) Notice: Subject to any disclaimer, the term of this patent is extended or adjusted under 35 U.S.C. 154(b) by 653 days.

(21) Appl. No.: 12/201,721

(22) Filed: Aug. 29, 2008

(65) Prior Publication Data

US 2009/0063473 A1 Mar. 5, 2009

Related U.S. Application Data

(60) Provisional application No. 60/969,490, filed on Aug. 31, 2007, provisional application No. 60/969,486, filed on Aug. 31, 2007, provisional application No. 60/969,478, filed on Aug. 31, 2007.

(51) Int. Cl.
*G06F 17/30* (2006.01)
(52) U.S. Cl. .................................. 704/4; 704/9
(58) Field of Classification Search .............. 704/4, 9
See application file for complete search history.

(56) References Cited

U.S. PATENT DOCUMENTS

| 4,876,643 A | 10/1989 | McNeill |
| 5,519,608 A | 5/1996 | Kupiec |
| 5,530,939 A | 6/1996 | Mansfield et al. |
| 5,696,962 A | 12/1997 | Kupiec |
| 5,933,822 A | 8/1999 | Braden-Harder et al. |
| 6,076,051 A | 6/2000 | Messerly |
| 6,161,084 A | 12/2000 | Messerly et al. |
| 6,189,002 B1 | 2/2001 | Roitblat |
| 6,243,670 B1 | 6/2001 | Bessho |
| 6,246,977 B1 | 6/2001 | Messerly et al. |
| 6,269,368 B1 | 7/2001 | Diamond |
| 6,366,908 B1 | 4/2002 | Chong et al. |

(Continued)

FOREIGN PATENT DOCUMENTS

CN 1606004 4/2005
(Continued)

OTHER PUBLICATIONS

A Semantic Search Engine for Learning Resources http://www.formatex.org/micte2005/349.pdf.

(Continued)

*Primary Examiner* — Kim Nguyen
(74) *Attorney, Agent, or Firm* — Shook, Hardy & Bacon L.L.P.

(57) ABSTRACT

Methods, systems and computer readable media for finding documents in a data store that match a natural language query submitted by a user are provided. The documents and queries are matched by determining that words within the query have the same relationship to each other as the same words in the document. Documents are semantically analyzed and words in the document are indexed along with the role the word plays in a sentence. The initial semantic role may be generalized using a role hierarchy and stored in the index along with the original role. A similar analysis may be used with the search query to find words used in the same role in both the query and the document.

20 Claims, 9 Drawing Sheets

U.S. PATENT DOCUMENTS

| | | | |
|---|---|---|---|
| 6,374,209 B1* | 4/2002 | Yoshimi et al. | 704/9 |
| 6,654,740 B2 | 11/2003 | Tokuda et al. | |
| 6,675,159 B1 | 1/2004 | Klein et al. | |
| 6,678,677 B2 | 1/2004 | Roux et al. | |
| 6,741,981 B2 | 5/2004 | McGreevy | |
| 6,766,316 B2 | 7/2004 | Caudill et al. | |
| 6,823,301 B1* | 11/2004 | Ishikura | 704/9 |
| 6,842,730 B1* | 1/2005 | Ejerhed et al. | 704/9 |
| 6,871,199 B1 | 3/2005 | Binnig et al. | |
| 6,901,399 B1 | 5/2005 | Corston | |
| 6,947,923 B2 | 9/2005 | Cha et al. | |
| 6,968,332 B1 | 11/2005 | Milic-Frayling | |
| 7,016,828 B1* | 3/2006 | Coyne et al. | 704/9 |
| 7,027,974 B1 | 4/2006 | Busch et al. | |
| 7,031,910 B2* | 4/2006 | Eisele | 704/10 |
| 7,035,789 B2* | 4/2006 | Abrego et al. | 704/9 |
| 7,120,574 B2 | 10/2006 | Troyanova et al. | |
| 7,171,349 B1* | 1/2007 | Wakefield et al. | 704/9 |
| 7,184,950 B2* | 2/2007 | Weise | 704/9 |
| 7,194,406 B2* | 3/2007 | Ejerhed et al. | 704/9 |
| 7,225,121 B2 | 5/2007 | Maxwell, III | |
| 7,269,594 B2 | 9/2007 | Corston-Oliver et al. | |
| 7,319,951 B2 | 1/2008 | Rising, III | |
| 7,346,490 B2 | 3/2008 | Fass et al. | |
| 7,398,201 B2* | 7/2008 | Marchisio et al. | 704/9 |
| 7,401,077 B2 | 7/2008 | Bobrow et al. | |
| 2002/0091684 A1 | 7/2002 | Nomiyama et al. | |
| 2003/0233224 A1* | 12/2003 | Marchisio et al. | 704/4 |
| 2004/0103090 A1 | 5/2004 | Dogl et al. | |
| 2004/0243554 A1 | 12/2004 | Broder et al. | |
| 2004/0243556 A1 | 12/2004 | Ferrucci et al. | |
| 2004/0249795 A1 | 12/2004 | Brockway | |
| 2005/0043936 A1 | 2/2005 | Corston-Oliver et al. | |
| 2005/0065777 A1 | 3/2005 | Dolan et al. | |
| 2005/0071150 A1 | 3/2005 | Nasypny | |
| 2005/0108001 A1 | 5/2005 | Aarskog | |
| 2005/0108630 A1 | 5/2005 | Wasson et al. | |
| 2005/0182619 A1 | 8/2005 | Azara | |
| 2005/0267871 A1 | 12/2005 | Marchisio et al. | |
| 2006/0047632 A1 | 3/2006 | Zhang | |
| 2006/0156222 A1 | 7/2006 | Chi | |
| 2006/0161534 A1 | 7/2006 | Carson et al. | |
| 2006/0184517 A1 | 8/2006 | Anderson et al. | |
| 2006/0224582 A1 | 10/2006 | Hogue | |
| 2006/0271353 A1 | 11/2006 | Berkan et al. | |
| 2007/0073533 A1 | 3/2007 | Thione | |
| 2007/0073745 A1 | 3/2007 | Scott | |
| 2007/0143098 A1 | 6/2007 | Van Den Berg | |
| 2007/0156393 A1 | 7/2007 | Todhunter et al. | |
| 2008/0033982 A1 | 2/2008 | Parikh | |
| 2008/0086498 A1 | 4/2008 | Sureka | |
| 2008/0120279 A1 | 5/2008 | Xue | |
| 2008/0172628 A1 | 7/2008 | Mehrotra et al. | |
| 2009/0271179 A1* | 10/2009 | Marchisio et al. | 704/9 |
| 2010/0106706 A1 | 4/2010 | Rorex et al. | |

FOREIGN PATENT DOCUMENTS

| | | |
|---|---|---|
| CN | 1658188 | 8/2005 |
| EP | 0597630 | 5/1994 |
| KR | 10-0546743 | 1/2006 |
| WO | 2002067145 A2 | 8/2002 |

OTHER PUBLICATIONS

U.S. Appl. No. 60/969,406, filed Aug. 31, 2007, Applying Term Occurrence Constraints in Natural Language Search.

U.S. Appl. No. 60/969,442, filed Aug. 31, 2007, Valence Calculus for Indexing with Special Reference to Reported Speech and Thought.

U.S. Appl. No. 60/969,447, filed Aug. 31, 2007, Bucketized Threshold for Runtime Ranking and Pruning of Senses.

U.S. Appl. No. 60/969,451, filed Aug. 31, 2007, Hierarchal Probability-Based Weighting for Hypernyms in Word Sense Disambiguation.

U.S. Appl. No. 60/969,417, filed Aug. 31, 2007, Checkpointing of Composable Lazily-Evaluated Iterators in Search.

U.S. Appl. No. 60/969,472, filed Aug. 31, 2007, Semi-Automatic Example-Based Induction of Semantic Translation Rules to Support Natural Language Search.

U.S. Appl. No. 60/969,426, filed Aug. 31, 2007, Indexing of Alias Clusters for Search.

U.S. Appl. No. 60/969,495, filed Aug. 31, 2007, Efficient Posting Layout for Retrieval of Terms in Dominance Hierarchies.

U.S. Appl. No. 60/969,434, filed Aug. 31, 2007, Aboutness Identification and Indexing.

U.S. Appl. No. 60/969,478, filed Aug. 31, 2007, Semantically-based Highlighting of Search Results.

U.S. Appl. No. 60/969,486, filed Aug. 31, 2007, Fact-based Indexing for Natural Language Search.

U.S. Appl. No. 60/969,490, filed Aug. 31, 2007, Indexing and Ranking Role Hierarchies Search Index.

U.S. Appl. No. 60/971,061, filed Sep. 10, 2007, A System for Browsing Knowledge on the Basis of Semantic Relations.

U.S. Appl. No. 60/969,483, filed Aug. 31, 2007, Integration of Coreference Resolution in an Ambiguity-Sensitive Natural Language Processing Pipeline for a Search Platform.

Semantic Searching and Text Analysis with Distinguo http://216.92.143.243/en/dox/Distinguo-White-Paper.pdf.

Information Extraction Supported Question Answering http://trec.nist.gov/pubs/trec8/papers/cymfony.pdf.

Ontology-Based Natural Language Query Processing for the Biological Domain http://acl.ldc.upenn.edu/W/W06/W06-3302.pdf.

Answer Extraction System by Question Type from Query Biased Summary for Newspaper Articles http://research.nii.ac.jp/ntcir/workshop/OnlineProceedings3/NTCIR3-QAC-SekiY.pdf.

Intro to Natural Language Processing Question Answering http://www.cs.cornell.edu/courses/cs474/2005fa/Handouts/advanced-qa.pdf.

PCT International Searching Authority, Powerset, Inc., Mar. 31, 2009, PCT/US2008/074987, International Filing Date: Sep. 2, 2008.

Dong-Il Han, et al., A Study on the Conceptual Modeling and Implementation of a Semantic Search System, Korea Intelligent Information Systems Society, Mar. 2008, vol. 14, No. 1, pp. 67-84 (English language Abstract p. 84).

Agichtein, Eugene and Gravano, Luis, "Snowball Extracting Relations from Large Plain-Text Collections," Columbia University Computer Science Dept. Technical Report CUCS-033-99, Dec. 1999, 13 pp.

Document Indexing: A Concept-Based Approach to Term Weight Estimation.

Hakia—Meaning-based Search Engine for a Better Search.

Users Satisfaction through Better Indexing.

International Search Report and Written Opinion of the ISA mailed Mar. 31, 2009 re International Appl. No. PCT/US2008/074987, Intl. Filing Date Sep. 2, 2008.

International Search Report and Written Opinion of the ISA mailed Mar. 31, 2009 re International Appl. No. PCT/US2008/074984, Intl. Filing Date Sep. 2, 2008.

International Search Report and Written Opinion of the ISA mailed Mar. 31, 2009 re International Appl. No. PCT/US2008/074981, Intl. Filing Date Sep. 2, 2008.

International Search Report and Written Opinion of the ISA mailed Apr. 29, 2009 re International Appl. No. PCT/US2008/074981, Intl. Filing Date Sep. 2, 2008.

Jun, M.S. and Park, S.Y., "Keyfact-Based Information Retrieval System", TaeJon, Korea.

Learning Ontology-based User Profiles: A Semantic Approach to Personalized Web Search.

Lo, Ka Kan and Lam, Wai, "Using Semantic Relations with World Knowledge for Question Answering," Dept. of Systems Engineering and Engineering Management, The Chinese University of Hong Kong, Hong Kong, 2008, 6 pp.

Manegold_et_al, A multi-query optimizer for Monet In: Centrum voor Wiskunde en Informatica, Jan. 31, 2000, see abstract, Section 2-3, and Figs. 1-3.

Measuring Aboutness of an Entity in a Text.

Non-Final Office Action mailed Dec. 23, 2010 re U.S. Appl. No. 12/201,978, filed Aug. 29, 2008 (12 pgs).

Non-Final Office Action mailed Jan. 3, 2011 re U.S. Appl. No. 12/201,596, filed Aug. 29, 2008 (20 pgs).

Non-Final Office Action mailed Jan. 25, 2011 re U.S. Appl. No. 12/201,675, filed Aug. 29, 2008 (5 pgs).

On the Problem of 'Aboutness' in Document Analysis, 1977.
Semantic Highlighting on the WWW: Educational Implications.
Semantic Search Methods.
Towards an Axiomatic Aboutness Theory for Information Retrieval.
Non-Final Office Action mailed Apr. 14, 2011 re U.S. Appl. No. 12/201,675.
Final Office Action in U.S. Appl. No. 12/201,504 mailed Oct. 12, 2011, 13 pages.
Final Office Action in U.S. Appl. No. 12/201,675 mailed Oct. 3, 2011, 15 pages.
Supplemental European Search Report dated Oct. 5, 2011 in Application No. 08799054.5-2201/2185999, 7 pages.
Non Final Office Action in U.S. Appl. No. 12/201,978 mailed Jan. 4, 2012, 15 Pages.
Smeaton, A.F and Quigley, I., "Experiments on Using Semantic Distances between Words in Images Caption Retrieval," School of Computer Applications, Working Paper: CA-0196, Dublin City University, Dublin, Ireland, 2008, 8 pp.
Tablan, V., Damljanovic, D., and Bontcheva, K., "A Natural Language Query Interface to Structured Information".
T.W.C. Huibers, Dept of Comp. Science, Utrecht University_The_ Netherlands, Email: theo@cs.ruu.nl, "Towards an Axiomatic Aboutness Theory for Information Retrieval."
Gholamreza Fadale Araghi, 2005, Cataloging & Classification Quarterly, 40(20, 5-17, "Users Satisfaction through Better Indexing."
Vintar, Spela, Buitelaar, Paul and Volk, Martin "Semantic Relations in Concept-Based Cross-Language Medical Information Retrieval," University of Sheffield, Dept. of Computer Science, United Kingdom, 2008, 9 pp.
Non-Final Office Action, mailed Apr. 14, 2011, in U.S. Appl. No. 12/201,675, 21 pp.
Final Office Action, mailed Jun. 22, 2011 in U.S. Appl. No. 12/201,596, 23 pages.
Final Office Action, mailed Jun. 7, 2011 in U.S. Appl. No. 12/201,978, 23 pages.
Office Action, mailed Mar. 17, 2011 in U.S. Appl. No. 12/201,504, 18 pages.
Notice of Allowance and Fees Due in U.S. Appl. No. 12/201,503 mailed Apr. 5, 2012, 7 pages.

* cited by examiner

Example Query     In index    Example Query

610 — *Who perceives something*     *John sees a cat* ~ 620     *Who sees an animal* ~ 660

John. sb ~ 622
626 John. sb ~ 624

612 — person. sb    person. sb    676    person. sb — 662
person.core ~ 628
entity. sb ~ 630
entity.core ~ 632    677
634 — see.relation    see.relation — 664

614 — perceive.relation    672    perceive.relation ~ 636
cat.ob ~ 638
cat.core ~ 640
feline.ob ~ 642
feline.core ~ 644    678
646 — animal.ob    animal.ob — 668
animal.core ~ 648

616 — entity.ob    674    entity.ob ~ 650
entity.core ~ 652

*FIG. 6.*

Example Query

*Who was somewhere?*~710

712—person._sb
714—be.relation
       entity._away_from~716
718—entity._entity.at
       entity._whr~720

In index

*John stayed at work*~730

732—John._sb
       person._sb~734
       entity.sb~735
       be.relation
       work.at ~739
       entity.at ~738

Example Query

*Where was John?*~740

John._sb~742 be.relation~744 entity._away_from~746
entity._at~748
entity._whr~750

Example Query

*Reading during work~810* read.relation~812 work..during~814
work..whn~816

In index

*John read at work~820*

John. sb~822
John.core~824
person. sb~826
person.core~828
entity. sb~830
832~read.relation
work.at~834
work. whr~836
work.vague~838
entity.at~840
entity . whr~842
entity .vague~844
746~entity. .whn

Example Query

*Reading before work~850* read.relation~852 work..before~854
work..whn~856

760

762

*FIG. 8.*

INDEXING ROLE HIERARCHIES FOR WORDS IN A SEARCH INDEX

CROSS-REFERENCE TO RELATED APPLICATIONS

This application claims the benefit of the following U.S. Provisional Applications having the respectively listed Application numbers and filing dates, and each of which is expressly incorporated by reference herein: 60/969,490, filed Aug. 31, 2007, U.S. Provisional Application No. 60/969,478, filed Aug. 31, 2007, U.S. and Provisional Application No. 60/969,486, filed Aug. 31, 2007.

STATEMENT REGARDING FEDERALLY SPONSORED RESEARCH OR DEVELOPMENT

Not applicable.

BACKGROUND

Search has become an increasingly important tool for conducting research or navigating documents accessible via a computer. Often, the search engines perform a matching process for detecting possible documents, or text within those documents, that utilizes a query submitted by a user. Initially, the matching process, offered for example online by conventional search engines such as those maintained by Google or Yahoo, allows the user to specify one or more keywords in the query to describe information that s/he is looking for. Next, the conventional online search engine proceeds to find all documents that contain exact matches of the keywords and typically presents the result for each document as a block of text that includes one or more of the keywords provided by the user therein.

Suppose, for example, that the user desired to discover which entity purchased the company PeopleSoft. Entering a query with the keywords "who bought PeopleSoft" to the conventional online engine produces the following as one of its results: "J. Williams was an officer, who founded Vantive in the late 1990s, which was bought by PeopleSoft in 1999." In this result, the words from the retrieved text that exactly matches the keywords "who," "bought," and "PeopleSoft," from the query, are bold-faced to give some justification to the user as to why this result is returned. Accordingly, providing a matching process that promotes exact keyword matching is not efficient for the user and often more misleading than useful.

Present conventional online search engines are limited in that they do not recognize words in the searched documents corresponding to keywords in the query beyond the exact matches produced by the matching process (e.g. noting PeopleSoft is a company, or IBM and Big Blue are the same) nor recognition the different roles words play in the document (e.g., failing to distinguish whether PeopleSoft is the agent of the Vantive acquisition or the target of the Oracle acquisition). Also, conventional online search engines are limited because a user is restricted to keywords in a query that are to be matched, and thus, do not allow the user to express precisely the information desired if unknown. Accordingly, implementing a natural language search engine to recognize semantic relations between keywords of a query and words in searched documents would uniquely increase the accuracy of the search results.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Embodiments of the present invention generally relate to computer-readable media and a computer system for finding documents in a data store that match a natural language query submitted by a user. The documents and queries are matched by determining that words within the query have the same relationship to each other as the same words in the document. For example, in the sentence "John reads a book at work" "John" is the subject and "book" is the object of the sentence. A document containing this sentence could be returned in response to the query "where does John read a book?" because "John" is the subject and "book" is the object of the query. Other documents in the data store having "John" as a subject and "book" as an object could be returned.

Words and relationships in queries are matched to words and relationships within document text using a searchable index. Embodiments of the present invention abstract one or more relationships between words in the text document and store these additional, broader, relationships in association with the word in the index. Embodiments of the present invention may also abstract relationships between words in the query and search the index using these additional word/relationship combinations. The role of a word may be abstracted using a role hierarchy. A role hierarchy organizes roles with a role getting more specific the further the role is from the root role. In a role hierarchy, a general role is the root node and more specific embodiments of the role are sublevel nodes. The dominant role is the more general or abstract role. The subservient role fits within the general definition of the dominant role but is more specific. For example, in the sentence "John reads at work" "at" could describe when the book is read. "When" could be expressed using other words such as "before" or "after." Thus, "when" is a dominant role that could include "at," "before," and "after" as subservient roles. "At," "before," and "after" all describe specific examples of "when." Thus, the "at" relationship associated with "book" could be expanded, or generalized, by associating "when" with "book."

In embodiments of the present invention, the roles played by a word in a document may be abstracted and stored in and index. In another embodiments, the roles assigned to words from a document are not expanded it is indexed. Instead the roles associated with words in the search query are expanded and used to search the index. In another embodiment, the roles associated with words in both the document and query are expanded.

BRIEF DESCRIPTION OF THE DRAWINGS

The present invention is described in detail below with reference to the attached drawing figures, wherein:

FIG. 6 is a diagram illustrating indexing the expanded roles associated with one or more words, in accordance with an embodiment of the present invention;

FIG. 7 is a diagram illustrating searching an index without expanded roles by expanding the roles assigned to words within the search query, in accordance with an embodiment of the present invention;

FIG. 8 is a diagram illustrating searching an index containing expanded roles with expanded roles assigned to words within the search query, in accordance with an embodiment of the present invention.

DETAILED DESCRIPTION

Figure 1:
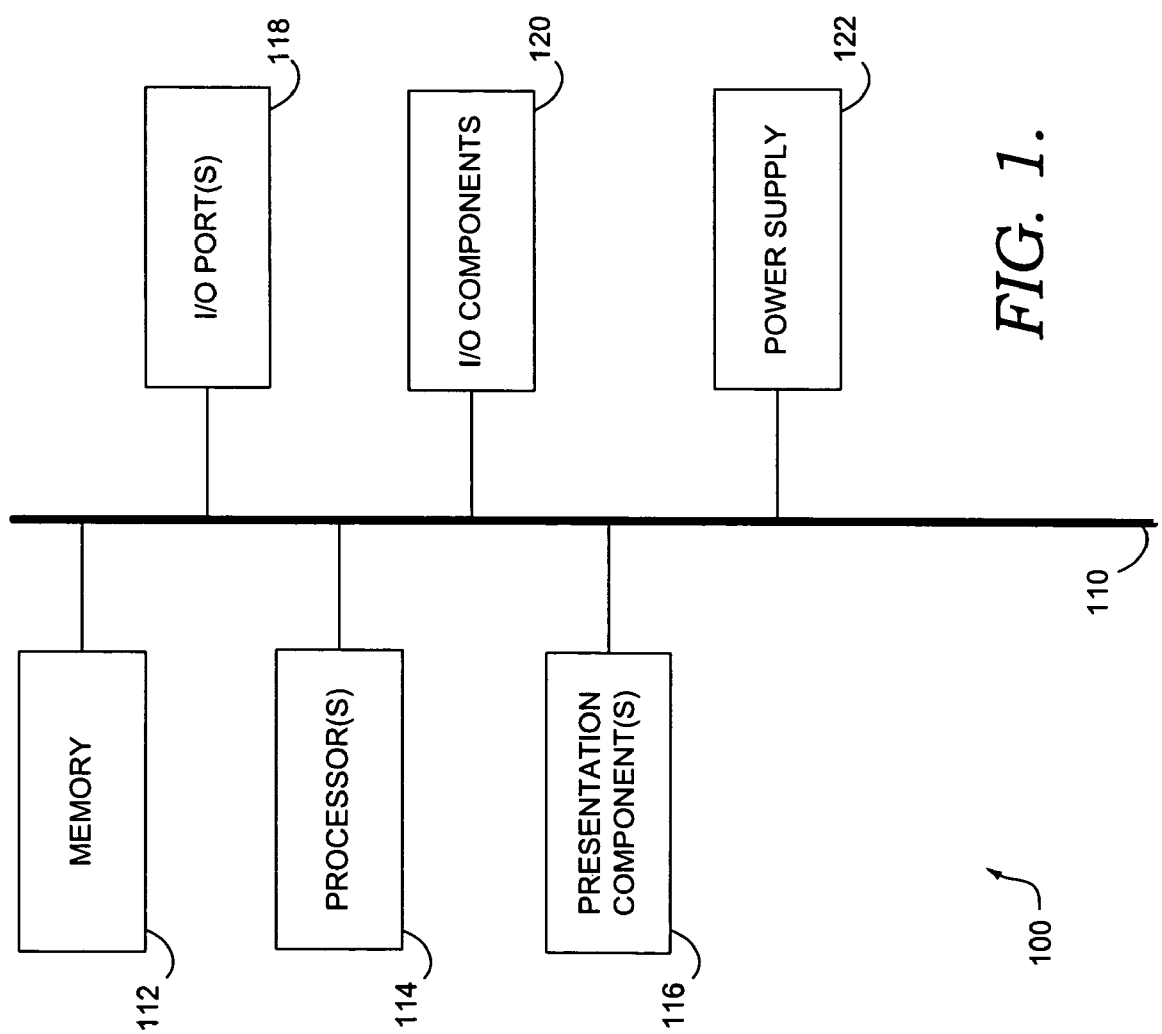
FIG. 1 is a block diagram of an exemplary computing environment suitable for use in implementing embodiments of the present invention.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Accordingly, in one embodiment, the present invention relates to computer-executable instructions, embodied on one or more computer-readable media, that perform a method of expanding and indexing semantic relationships between words within a sentence. The method includes receiving a first electronic document having content that includes text, parsing the text into one or more sentences, and determining a first role for a word in the sentence, wherein a role is a type of semantic relationship to other words in the sentence. The method also includes determining that the word has more than one potential role and assigning a second role to the word. The method further includes storing the word with the first role and the second role in an index that associates the word and the sentence with the first electronic document, thereby allowing a search engine to match the first electronic document with a search query that includes similar words having similar roles.

In another embodiment, aspects of the present invention involve a computerized system for matching a search query to text within a one or more documents including a first semantic interpretation component for: (1) assigning a primary role to words in the search query, wherein a role is a semantic relationship between the words, and the search query is a natural language search query and; (2) assigning an additional role to at least one word from the search query having the primary role using a role hierarchy, wherein the role hierarchy includes a hierarchy of roles including a root role that is general and multiple levels of sub roles that are more specific than the root role. The computerized system also includes a matching component for determining that at least one document referenced in an index includes a word from the search query, wherein the word in the at least one document and the word in the search query are assigned at least one of the same roles.

In yet another embodiment, the present invention encompasses one or more computer-storage media having computer-executable instructions embodied thereon for performing a method of indexing document contents using a role hierarchy. The method includes receiving a sentence that is part of a document, assigning a role to words in the sentence, and assigning at least one additional role to the words using the role hierarchy, wherein the role hierarchy includes a hierarchy of roles including a root role that is general and at least one level of sub roles that are more specific than the root role, thereby assigning at least one word at least two roles. The method also includes storing the words with and one or more roles assigned to individual words in an index that associates the words and the sentence with the document.

Having briefly described an overview of embodiments of the present invention and some of the features therein, an exemplary operating environment suitable for implementing the present invention is described below.

Description of Operating Environment

Referring to the drawings in general, and initially to FIG. 1 in particular, an exemplary operating environment for implementing embodiments of the present invention is shown and designated generally as computing device 100. Computing device 100 is but one example of a suitable computing environment and is not intended to suggest any limitation as to the scope of use or functionality of the invention. Neither should the computing device 100 be interpreted as having any dependency or requirement relating to any one or combination of components illustrated.

The invention may be described in the general context of computer code or machine-useable instructions, including computer-executable instructions such as program components, being executed by a computer or other machine, such as a personal data assistant or other handheld device. Generally, program components including routines, programs, objects, components, data structures, and the like, refer to code that performs particular tasks or implements particular abstract data types. Embodiments of the present invention may be practiced in a variety of system configurations, including handheld devices, consumer electronics, general-purpose computers, specialty computing devices, etc. Embodiments of the invention may also be practiced in distributed computing environments where tasks are performed by remote-processing devices that are linked through a communications network.

With continued reference to FIG. 1, computing device 100 includes a bus 110 that directly or indirectly couples the following devices: memory 112, one or more processors 114, one or more presentation components 116, input/output (I/O) ports 118, I/O components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear and, metaphorically, the lines would more accurately be grey and fuzzy. For example, one may consider a presentation component such as a display device to be an I/O component. Also, processors have memory. The inventors hereof recognize that such is the nature of the art and reiterate that the diagram of FIG. 1 is merely illustrative of an exemplary computing device that can be used in connection with one or more embodiments of the present invention. Distinction is not made between such categories as "workstation," "server," "laptop," "handheld device," etc., as all are contemplated to be within the scope of FIG. 1 in reference to "computer" or "computing device."

Computing device 100 typically includes a variety of computer-readable media. By way of example, and not limitation, computer-readable media may comprise Random Access Memory (RAM); Read Only Memory (ROM); Electronically Erasable Programmable Read Only Memory (EEPROM); flash memory or other memory technologies; CDROM, digital versatile disks (DVDs) or other optical or holographic media; magnetic cassettes, magnetic tape, magnetic disk storage or other magnetic storage devices; or any other medium that can be used to encode desired information and be accessed by computing device 100.

Memory 112 includes computer-storage media in the form of volatile and/or nonvolatile memory. The memory may be removable, nonremovable, or a combination thereof. Exemplary hardware devices include solid-state memory, hard drives, optical-disc drives, etc. Computing device 100 includes one or more processors that read data from various entities such as memory 112 or I/O components 120. Presentation component(s) 116 present data indications to a user or other device. Exemplary presentation components include a display device, speaker, printing component, vibrating component, etc. I/O ports 118 allow computing device 100 to be logically coupled to other devices including I/O components 120, some of which may be built in. Illustrative components include a microphone, joystick, game pad, satellite dish, scanner, printer, wireless device, etc.

Description of Exemplary System Architecture

Figure 2:
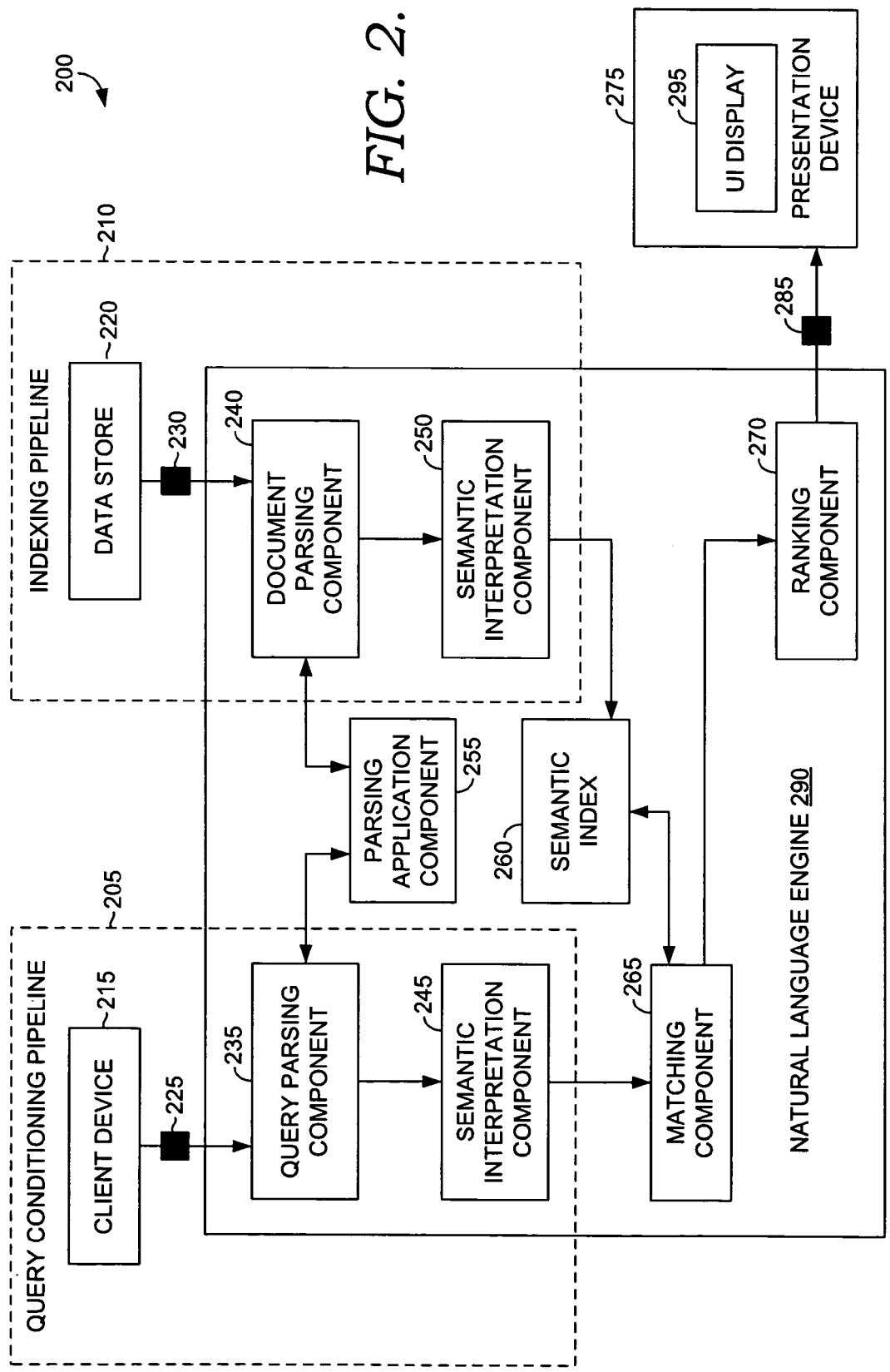
FIG. 2 is a schematic diagram of an exemplary system architecture suitable for use in implementing embodiments of the present invention.

Turning now to FIG. 2, a schematic diagram of an exemplary system architecture 200 suitable for matching search queries to documents using relationships between words within documents and with search queries in accordance with an embodiment of the present invention is shown. It will be understood and appreciated by those of ordinary skill in the art that the exemplary system architecture 200 shown in FIG. 2 is merely an example of one suitable computing environment and is not intended to suggest any limitation as to the scope of use or functionality of the present invention. Neither should the exemplary system architecture 200 be interpreted as having any dependency or requirement related to any single component or combination of components illustrated therein.

As illustrated, the system architecture 200 may include a distributed computing environment, where a client device 215 is operably coupled to a natural language engine 290, which, in turn, is operably coupled to a data store 220. In embodiments of the present invention that are practiced in distributed computing environments, the operable coupling refers to linking the client device 215 and the data store 220 to the natural language engine 290, and other online components through appropriate connections. These connections may be wired or wireless. Examples of particular wired embodiments, within the scope of the present invention, include USB connections and cable connections over a network (not shown). Examples of particular wireless embodiments, within the scope of the present invention, include a near-range wireless network and radio-frequency technology.

It should be understood and appreciated that the designation of "near-range wireless network" is not meant to be limiting, and should be interpreted broadly to include at least the following technologies: negotiated wireless peripheral (NWP) devices; short-range wireless air interference networks (e.g., wireless personal area network (wPAN), wireless local area network (wLAN), wireless wide area network (wWAN), Bluetooth™, and the like); wireless peer-to-peer communication (e.g., Ultra Wideband); and any protocol that supports wireless communication of data between devices. Additionally, persons familiar with the field of the invention will realize that a near-range wireless network may be practiced by various data-transfer methods (e.g., satellite transmission, telecommunications network, etc.). Therefore it is emphasized that embodiments of the connections between the client device 215, the data store 220, and the natural language engine 290, for instance, are not limited by the examples described, but embrace a wide variety of methods of communications.

Exemplary system architecture 200 includes the client device 215 for, in part, supporting operation of the presentation device 275. In an exemplary embodiment, where the client device 215 is a mobile device for instance, the presentation device (e.g., a touch-screen display) may be disposed on the client device 215. In addition, the client device 215 may take the form of various types of computing devices. By way of example only, the client device 215 may be a personal computing device (e.g., computing device 100 of FIG. 1), handheld device (e.g., personal digital assistant), a mobile device (e.g., laptop computer, cell phone, media player), consumer electronic device, various servers, and the like.

In embodiments, as discussed above, the client device 215 includes, or is operably coupled to the presentation device 275, which is configured to present a UI display 295 on the presentation device 275. The presentation device 275 may be configured as any display device that is capable of presenting information to a user, such as a monitor, electronic display panel, touch-screen, liquid crystal display (LCD), plasma screen, one or more light-emitting diodes (LED), incandescent bulbs, a laser, an electroluminescent light source, a chemical light, a flexible light wire, and/or fluorescent light, or any other display type, or may comprise a reflective surface upon which the visual information is projected. Although several differing configurations of the presentation device 275 have been described above, it should be understood and appreciated by those of ordinary skill in the art that various types of presentation devices that present information may be employed as the presentation device 275, and that embodiments of the present invention are not limited to those presentation devices 275 that are shown and described.

In one exemplary embodiment, the UI display 295 rendered by the presentation device 275 is configured to display a web page (not shown) that is associated with natural language engine 290 and/or a content publisher. In an embodiment, the web page may reveal a search-entry area that receives a query and search results that are discovered by searching the Internet with the query. The query may be provided by a user at the search-entry area, or may be automatically generated by software. In addition, as more fully discussed below, the query may include one or more words that, when submitted, invoke the natural language engine 290 to identify appropriate search results that are most responsive to the words in a query.

The natural language engine 290, shown in FIG. 2, may take the form of various types of computing devices, such as, for example, the computing device 100 described above with reference to FIG. 1. By way of example only and not limitation, the natural language engine 290 may be a personal computer, desktop computer, laptop computer, consumer electronic device, handheld device (e.g., personal digital assistant), various remote servers (e.g., online server cloud), processing equipment, and the like. It should be noted, however, that the invention is not limited to implementation on such computing devices but may be implemented on any of a variety of different types of computing devices within the scope of embodiments of the present invention.

Further, in one instance, the natural language engine 290 is configured as a search engine designed for searching for information on the Internet and/or the data store 220, and for gathering search results from the information, within the scope of the search, in response to submission of the query via the client device 215. In one embodiment, the search engine includes one or more web crawlers that mine available data (e.g., newsgroups, databases, open directories, the data store 220, and the like) accessible via the Internet and build a semantic index 260 containing web addresses along with the subject matter of web pages or other documents stored in a meaningful format. In another embodiment, the search engine is operable to facilitate identifying and retrieving the search results (e.g., listing, table, ranked order of web addresses, and the like) from the semantic index that are responsive to a submitted query. The search engine may be accessed by Internet users through a web-browser application disposed on the client device 215. Accordingly, the users may conduct an Internet search by submitting a search query in the search-entry area (e.g., displayed on the UI display 295 generated by the web-browser application associated with the search engine).

The data store 220 is generally configured to store information associated with documents (including web pages) that have searchable content associated therewith. In various embodiments, such documents may include, without limitation, content of a web page/site, electronic materials accessible via the Internet or a local intranet, and other typical resources available to a search engine. In addition, the data store 220 may be configured to be searchable for suitable access of the stored information. For instance, the data store 220 may be searchable for one or more documents selected for processing by the natural language engine 290. In embodiments, the natural language engine 290 is allowed to freely inspect the data store for documents that have been recently added or amended in order to update the semantic index. The process of inspection may be carried out continuously, in predefined intervals, or upon an indication that a change has occurred to one or more documents aggregated at the data store 220. It will be understood and appreciated by those of ordinary skill in the art that the information stored in the data store 220 may be configurable and may include any information within a scope of an online search. The content and volume of such information are not intended to limit the scope of embodiments of the present invention in any way. Further, though illustrated as a single, independent component, the data store 220 may, in fact, be a plurality of databases, for instance, a database cluster, portions of which may reside on the client device 215, the natural language engine 290, another external computing device (not shown), and/or any combination thereof. Data store 220 may also include computers forming the Internet.

Generally, the natural language engine 290 provides a tool to find information within data store 220. In embodiments, the natural language engine 290 receives a search query and presents search results that are responsive to the query. In embodiments, the natural language engine 290 operates by applying natural language processing technology to compute the meanings of passages in sets of documents, such as documents drawn from the data store 220. These meanings are stored in the semantic index 260 that is referenced upon executing a search. Initially, when a user enters a query into the search-entry area, a query search pipeline 205 analyzes the user's query (e.g., a character string, complete words, phrases, alphanumeric compositions, symbols, or questions) and determines the semantic relationships between words in the search query. These relationships may be used to find relevant search results.

In one instance, the information stored in the semantic index 260 includes representations extracted from the documents in data store 220, or any other materials encompassed within the scope of an online search. This representation, referred to hereinafter as a "semantic representation," relates to the intuitive meaning of content distilled from common text and may be stored in the semantic index 260. The semantic representation includes words from the text associated with one or more relationships that are assigned by analyzing the relationships between words in the text. The architecture of the semantic index 260 allows for rapid comparison of the words and relationships stored in the semantic representations against the semantic relationships associated with words in the search query in order to retrieve documents mapped to the semantic representations that are relevant to the submitted query. Accordingly, the natural language engine 290 can determine the meaning of a user's query from the words submitted into a search interface (e.g., the search-entry area surfaced on the UI display 295), and then to sift through a large amount of information in the semantic index to find search results that match the meaning of the query.

In embodiments, the process above may be implemented by various functional elements that carry out one or more steps for discovering relevant search results. These functional elements include a query parsing component 235, a document parsing component 240, a semantic interpretation component 245, a semantic interpretation component 250, a parsing application component 255, the semantic index 260, a matching component 265, and a ranking component 270. These functional components 235, 240, 245, 250, 255, 260, 265, and 270 generally refer to individual modular software routines, and their associated hardware that are dynamically linked and ready to use with other components or devices.

The data store 220, the document parsing component 240, and the semantic interpretation component 250 comprise an indexing pipeline 210. In operation, the indexing pipeline 210 serves to distill the assigned relationships to words from content within documents 230 accessed at the data store 220, and to construct the semantic index 260 upon determining the relationships. As discussed above, when aggregated to form the semantic index 260, the words and relationships retain a mapping to the documents 230, and/or location of content within the documents 230, from which they were derived.

Generally, the document parsing component 240 is configured to gather data that is available to the natural language engine 290. In one instance, gathering data includes inspecting the data store 220 to scan content of documents 230, or other information, stored therein. Because, the information within the data store 220 may be constantly updated, the process of gathering data may be executed at a regular interval, continuously, or upon notification that an update is made to one or more of the documents 230.

Upon gathering the content from the documents 230 and other available sources, the document parsing component 240 performs various procedures to prepare the content for semantic analysis. These procedures may include text extraction, entity recognition, and parsing. The text extraction procedure substantially involves extracting tables, images, templates, and textual sections of data from the content of the documents 230 and to converting them from a raw online format to a usable format (e.g., HyperText Markup Language (HTML)), while saving links to documents 230 from which they are extracted in order to facilitate mapping. The usable format of the content may then be split up into sentences. In one instance, breaking content into sentences involves assembling a string of characters as an input, applying a set of rules to test the character string for specific properties, and, based on the specific properties, dividing the content into sentences. By way of example only, the specific properties of the content being tested may include punctuation and capitalization in order to determine the beginning and end of a sentence. Once a series of sentences is ascertained, each individual sentence is optionally examined to detect words therein and to potentially recognize each word as an object (i.e., "The Hindenburg"), an event (i.e., "World War II"), a time (i.e., "September"), a verb ("walk") or any other category of word that may be utilized for promoting distinctions between words or for understanding the meaning of the subject sentence.

The entity recognition procedure assists in recognizing which words are names, as they provide specific answers to question-related queries (e.g., who, where, when). In embodiments, recognizing words includes identifying words as names and annotating the word with a tag to facilitate retrieval when interrogating the semantic index 260. In one instance, identifying words as names includes looking up the words in predefined lists of names to determine if there is a match. If no match exists, statistical information may be used to guess whether the word is a name. For example, statistical information may assist in recognizing a variation of a complex name, such as "USS Enterprise," which may have several common variations in spelling.

The parsing procedure, when implemented, provides insights into the structure of the sentences identified above. In one instance, these insights are provided by applying rules maintained in a framework of the parsing application component 255. Parsing may be implemented based on Lexical Functional Grammar (LFG), Head-Driven Phrase Structure Grammar (HPSG), Combinatory categorical grammar (CCG), Probabilistic Context-free Grammar (PCFG) parsers based on the minimalist framework or any other parsing framework. When applied, these rules, or grammars, expedite analyzing the sentences to ascertain the relationships among the words in the sentences. If the parser is an LFG parser, then the relationships between words may be referred to as functional structures. The output of the parsing application component 255 captures critical information about the structure of the sentence (e.g., verb, subject, object, and the like) that is further processed by the semantic interpretation component 250.

The semantic interpretation component 250 is generally configured to diagnose the role of each word in the syntactic structure by recognizing a semantic relationship between the words. Initially, diagnosing may include analyzing the grammatical organization of the syntactic structure and separating the syntactic structure into logical assertions (e.g., prepositional phrases) that each express a discrete idea and particular facts. These logical assertions may be further analyzed to determine a function of each of a sequence of words that comprises the assertion. If appropriate, based on the function or role of each word, one or more of the sequence of words may be expanded to include synonyms (i.e., linking to other words that correspond to the expanded word's specific meaning) or hypernyms (i.e., linking to other words that generally relate to the expanded word's general meaning). This expansion of the words, the function each word serves in an expression (discussed above), a grammatical relationship of each of the sequence of words, and any other information about the semantic representation, recognized by the semantic interpretation component 250, may be stored at the semantic index 260. Similarly, as described in more detail below, the primary role or relationship assigned to a word may be expanded to include more general roles that encompass the primary role. The additional roles may likewise be stored in the semantic index 260.

The semantic index 260 serves to store the relationships between words derived by the indexing pipeline 210 and may be configured in any manner known in the relevant field. By way of example, the semantic index 260 may be configured as an inverted index that is structurally similar to conventional search engine indexes. In this exemplary embodiment, the inverted index is a rapidly searchable database whose entries are words with pointers to the documents 230, and locations therein, on which those words occur. Accordingly, when writing the information about the semantic representations to the semantic index 260, each word and associated function is indexed along with the pointers to the sentences in documents in which the word appeared. This framework of the semantic index 260 allows the matching component 265 to efficiently access, navigate, and match stored information to recover meaningful search results that correspond with the submitted query.

The client device 215, the query parsing component 235, and the semantic interpretation component 245 comprise a query conditioning pipeline 205. Similar to the indexing pipeline 210, the query conditioning pipeline 205 distills meaningful information from a sequence of words. However, in contrast to processing passages within documents 230, the query conditioning pipeline 205 processes words submitted within a query 225. In one embodiment, the query is a natural language query with words having a semantic relationship to each other. For instance, the query parsing component 235 receives the query 225 and performs various procedures to prepare the words for semantic analysis thereof. These procedures may be similar to the procedures employed by the document parsing component 240 such as text extraction, entity recognition, and parsing. In addition, the structure of the query 225 may be identified by applying rules maintained in a framework of the parsing application component 255, thus, deriving a meaningful representation of the relationships between words in the query 225.

In embodiments, the semantic interpretation component 245 may process the query in a substantially comparable manner as the semantic interpretation component 250 interprets a passage of text in a document 230. In embodiments, the semantic interpretation component 245 may identify a normalized grammatical relationship between words that comprise the query 225. By way of example, identifying the normalized grammatical relationship includes identifying whether a word functions as the subject (agent of an action), object, predicate, indirect object, or temporal location of query 225. For example, in the sentence "Who was beaten by John?", "who" is the subject, but "John" is the normalized subject of "beaten." In another instance, the query is evaluated to identify a logical language structure associated with each of the words. By way of example, evaluation may include one or more of the following steps: determining a function of at least one of the words in the query; based on the function, replacing the words with a logical variable that encompasses a plurality of meanings; and using those meanings to search the semantic index 260. The words and relationships distilled from the query 225 are sent to the matching component 265 for comparison against the words and relationships extracted from the documents 230 and stored at the semantic index 260.

In an exemplary embodiment, the matching component 265 compares the words with their assigned relationships of the queries 225 against the words and relationships in the semantic index 260 to ascertain matches. A query and document match when both have the same word assigned to the same role or relationship. The matches in the semantic index 260 may be mapped back to the documents 230 from which they were extracted utilizing the tags in the semantic index 260. These documents 230, targeted by the tags, are collected and sorted by the ranking component 270. Sorting may be performed in any known method within the relevant field, and may include without limitation, ranking according to closeness of match, listing based on popularity of the returned documents 230, or sorting based on attributes of the user submitting the query 225. These ranked documents 230 comprise the search result 285 and are conveyed to the presentation device 275 for surfacing in an appropriate format on the UI display 295. In one embodiment, a higher rank is given when a word with a specific relationship in the query matches a word with a specific relationship in the document. A lower rank is given when a word with a general relationship in the query matches a word with a general relationship in the document.

With continued reference to FIG. 2, this exemplary system architecture 200 is but one example of a suitable environment that may be implemented to carry out aspects of the present invention and is not intended to suggest any limitation as to the scope of use or functionality of the invention. Neither should the illustrated exemplary system architecture 200, or the natural language engine 290, be interpreted as having any dependency or requirement relating to any one or combination of the components 235, 240, 245, 250, 255, 260, 265, and 270 as illustrated. In some embodiments, one or more of the components 235, 240, 245, 250, 255, 260, 265, and 270 may be implemented as stand-alone devices. In other embodiments, one or more of the components 235, 240, 245, 250, 255, 260, 265, and 270 may be integrated directly into the client device 215. It will be understood by those of ordinary skill in the art that the components 235, 240, 245, 250, 255, 260, 265, and 270 illustrated in FIG. 2 are exemplary in nature and in number and should not be construed as limiting.

Accordingly, any number of components may be employed to achieve the desired functionality within the scope of embodiments of the present invention. Although the various components of FIG. 2 are shown with lines for the sake of clarity, in reality, delineating various components is not so clear, and metaphorically, the lines would more accurately be grey or fuzzy. Further, although some components of FIG. 2 are depicted as single blocks, the depictions are exemplary in nature and in number and are not to be construed as limiting (e.g., although only one presentation device 275 is shown, many more may be communicatively coupled to the client device 215).

Figure 3:
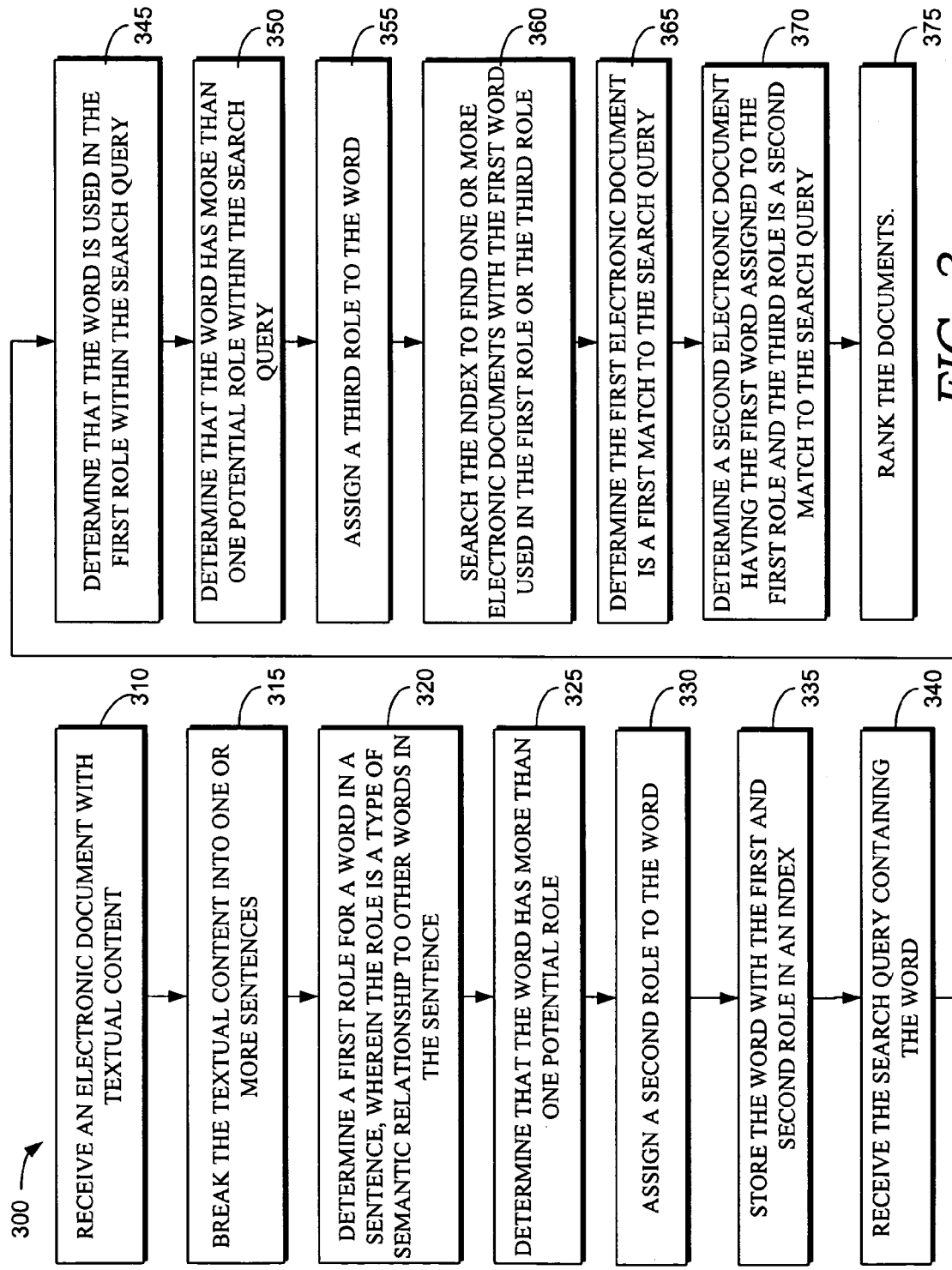
FIG. 3 is a flow chart illustrating a method of expanding and indexing a semantic relationship between words within a sentence, in accordance with an embodiment of the present invention.

Turning now to FIG. 3, a flow chart illustrating a method of expanding and indexing a semantic relationship between words within a sentence is shown, in accordance with an embodiment of the present invention. A step 310, a first electronic document having content that includes text is received. The electronic document may be stored in a data store such as data store 220. The electronic document may be a website, spreadsheet, word processing file, email, or other such electronic document. The text includes words organized to communicate a meaning according to the protocols of known language, such as English or French. Embodiments of the present invention are not limited to a particular language and could be equally applicable to any language.

At step 315, the text is parsed into one or more sentences. Sentences are parsed by applying algorithms to the text that are designed to recognize sentences in a given language. The words in a sentence have defined roles in relation to one another. For example, in the sentence "John reads a book at work," John is the subject, book is the object, and read is a verb that forms a relationship between John and the book. "Read" and "work" are in a relationship described by "at." At step 320, a word in a sentence is determined to be in a first role. The remaining words in the sentence may also be assigned roles. Multiple words in a sentence may have the same role. For example, a sentence could have more than one subject or object.

Figure 4:
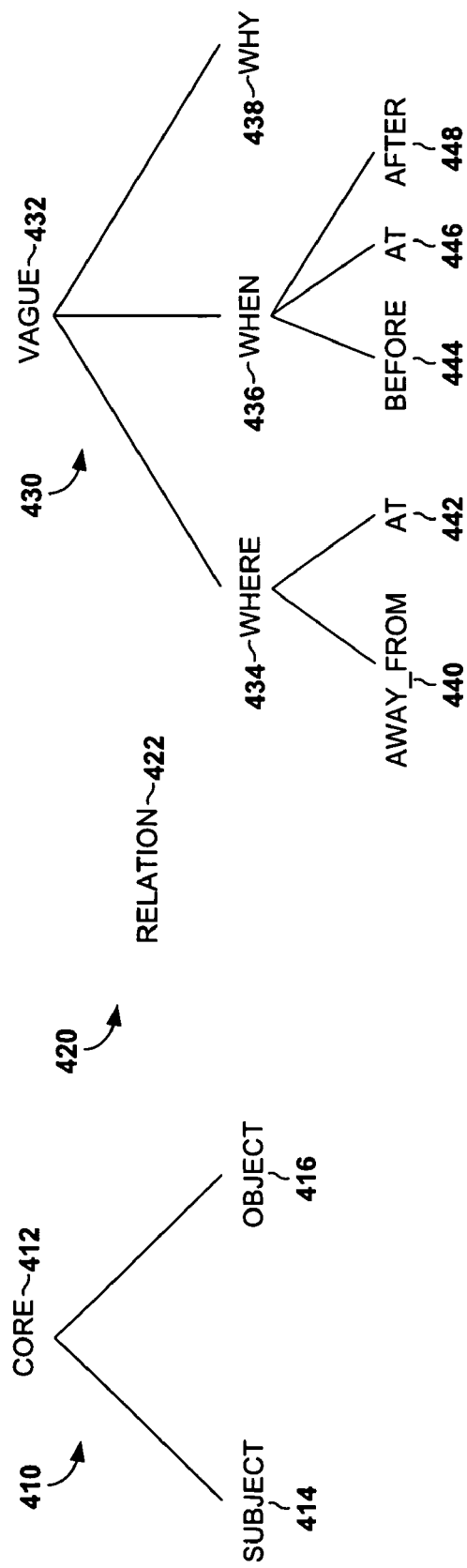
FIG. 4 is a diagram illustrating three role hierarchies, in accordance with an embodiment of the present invention.
Figure 5:
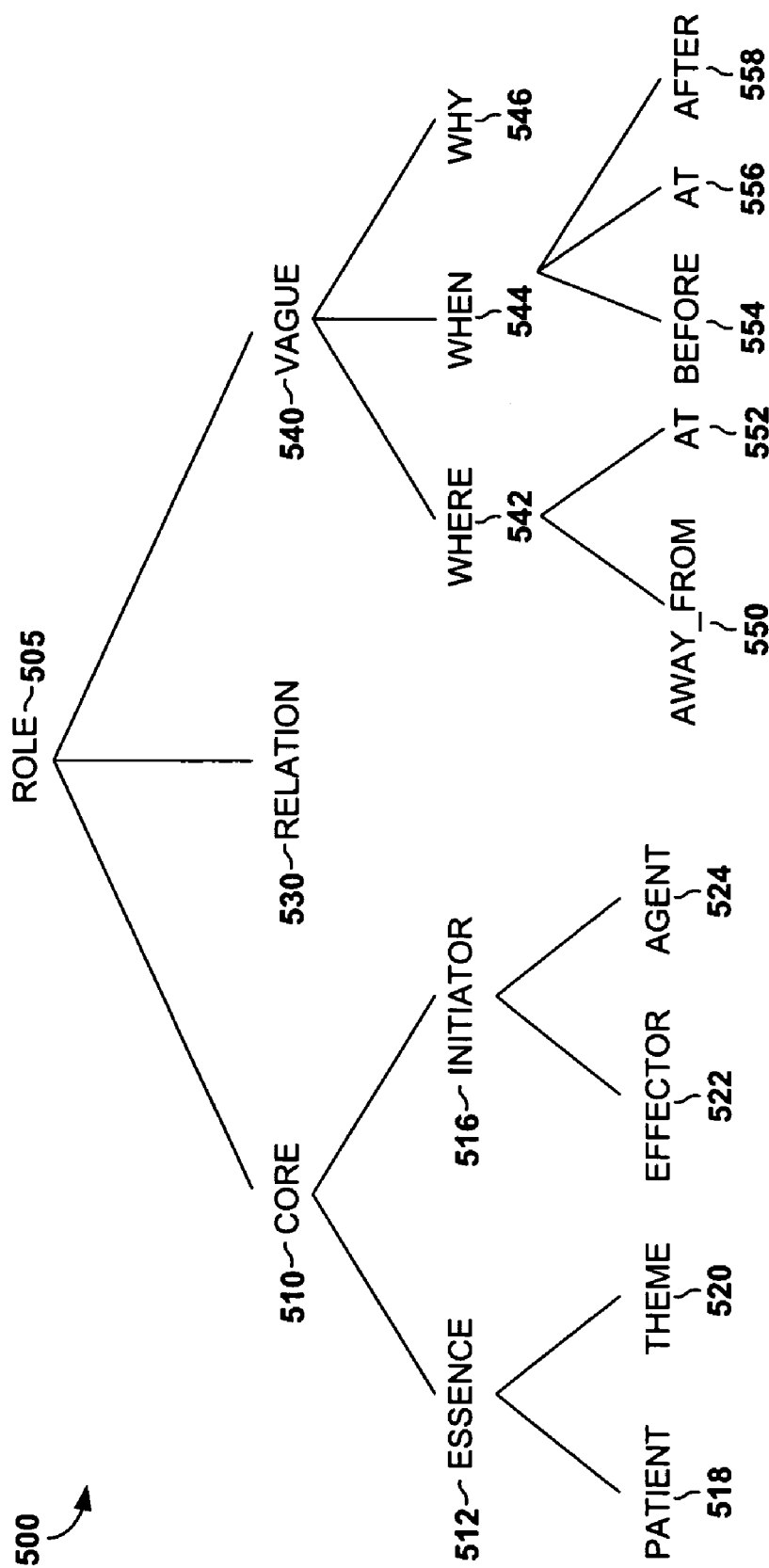
FIG. 5 is a diagram illustrating a single role hierarchy, in accordance with an embodiment of the present invention.

At step 325, it is determined that the word has more than one potential role. In other words, the word could play more than one role. For example, in the sentence "John reads a book at work" at could be role type that describes when John reads or where John reads. A word is determined to have more than one potential role by referencing one or more role hierarchies. Examples of role hierarchies are shown in FIGS. 4 and 5. These role hierarchies are simplified for the sake of illustration. A working role hierarchy could contain numerous relationships. A role hierarchy includes at least two levels. The first level, or root node, is a more general expression of a relationship between words. The sublevels below the root node contain more specific embodiments of the relationship described by the root note.

Turning now to FIG. 4, three role hierarchies that may be used in combination with each other are shown. Role hierarchy 410 includes root node "core" 412 and sub nodes "subject" 414 and "object" 416. "Subject" 414 and "object" 416 are on the same level and, thus, have equal specificity. Role hierarchy 420 includes a "head" 422 and "relation" 424. Role hierarchy 430 includes root node "vague" 432, sub nodes "where" 434, "when" 436, and "why" 438. The sub node "where" 434 has sub nodes "away from" 440 and "at" 442. Sub node "when" 436 has sub nodes 444 before, "at" 446, and "after" 448. The root nodes "core" 412, "head" 422, and "vague" 432 may act as placeholders that encompass all of the relationships underneath them in the role hierarchy. Relationships on the same level of the role hierarchy are considered to have the same level of specificity. For example, role "subject" 414 and role "object" 416 are equally specific.

Looking at role hierarchy 430, it can be seen that "at" appears as a sub node to "where" 434 and "when" 436. Thus, "at" could have more than one potential role. In the example sentence "John reads a book at work" "at" describes a relationship between "reads" and "work." "At" would be the first relationship associated with work, and "where" 434, "when" 436, and/or "vague" 432 could be associated as a secondary relationships with work. In one embodiment, all four potential relationships are associated with the word "work." FIG. 4 illustrates that multiple role hierarchies may be used when analyzing a relationship between words. In the alternative, all relationships may be expressed in a single hierarchy as in FIG. 5.

Turning now to FIG. 5, an example single role hierarchy 500 is shown in accordance with an embodiment of the present invention. The root node is "role" 505. The first level of sub nodes includes "core" 510, "relation" 530, and "vague" 540. Underneath node "core" 510 are "essence" 512 and "initiator" 516. The nodes under "essence" 512 include "patient" 518 and "theme" 520. Under node "initiator" 516 are node "effector" 522 and "agent" 524. Under node "where" 542, are nodes "away from" 550 and "at" 552. Under node "when" 544 are nodes "before" 554, "at" 556, and "after" 558. As illustrated by "at," a single relationship may be a child node to more than one parent node. The core roles are roles of participants that are seen as basic to the element that has the relation role. These involve participants that are the cause of change (initiator) either voluntary (agent) or involuntary (effector), and participants that participate without causing change (essence), either undergoing change (patient) or not undergoing change (theme). For example, in "John broke the window", "John" is the agent and "window"

the patient, in "The storm broke the window", "storm" is the effector. In "John sees the storm", "storm" is the theme.

Returning now to FIG. 3, at step 330, a second role is assigned to the word that had already been assigned a primary role. Secondary roles may also be assigned to other words in the sentence. The second role is assigned by moving up one or more levels on a role hierarchy. For example, referring again to FIG. 5, when the first role is "at," the second role could be "where" 54, "when" 544, and/or "vague" 540. At step 335, the word is stored with the first role and a second role in an index that associates the word and the sentence with the first electronic document from which the sentence came. This allows a search engine to match the first electronic document with a search query that includes similar words having similar roles. In one embodiment, the word and an assigned role are stored in a term. The term may consist of one word and one role. Thus, a term could be "work.at" or "work.when" or "work.where." In another embodiment, the term includes a word and a relationship and one or more additional relationships in a payload. Thus, the term could be work.vague (at, where, when). The payload includes (at, where, when). In this example, the word is associated with the most general role in the role hierarchy and the sub roles are included in the payload. The second embodiment may potentially save memory space in the index.

At step 340, a search query using the same word as the word in the sentence is received. The search query may be received through a user interface presented by a search engine over the Internet. The search query may also be received in other manners. In one embodiment, the search query is a natural language query using words in relationships with one another as they would be used in speech. At step 345, it is determined that the word from the query is used in the first role within the search query. At step 350, it is determined that the word has more than one potential role within the search query. As described previously, a word may be determined to have more potential roles if it occurs in a sublevel of a role hierarchy. At step 355, an additional role is assigned to the word in the query. Thus, at the completion of step 355, the role of at least one word in the query has been expanded and the role of at least one word in an electronic document has been expanded and stored in an index.

At step 360, the index is searched to find one or more electronic documents having the first word used in one or more of the first role and the third role. Recall that the first role and the third role were the roles assigned to the word in conjunction with its occurrence in the search query. At step 365, the first electronic document is determined to be a match to the search query. The first electronic document is a match to the search query because it contains the first word in the first role. At step 370, a second electronic document having the first word assigned to the first role and the third role is a second match to the search query. At step 375, the second electronic document is ranked as a better match to the search query than the first electronic document because the second electronic document contains the word associated with two roles that are in common with the roles assigned to the query rather than just one role in common. Specifically, both the occurrence of the word in the query and in the second document is associated with the first role and the third role. In another embodiment, a higher ranking is given when the same word is associated with the same specific role in both the document and the search query in contrast to another document where the same word is associated with a more general role in both the search query and a document.

FIG. 6 illustrates indexing words and roles within a sentence and matching the sentence to two example queries. In this embodiment, both the words from the sentence and the roles assigned to those words in the sentence are expanded and added to the index. In the embodiment illustrated by FIG. 6, the words and roles in the query are not expanded. The semantic analysis of the sentence "John sees a cat" 620 generates a series of entries in the index that will all be associated with the sentence 620 and the document from which the sentence 620 is taken. The associations to the sentence and document are not shown. The terms include John.sb 622, wherein sb stands for subject. The next term is John.core 624, which is an expansion of the subject role assigned to John. The next term is person.sb 626. Term 626 expands the word John and assigns it to the unexpanded role subject. The next term person.core 628 includes an expanded word for John and an expanded role for subject. Term entity.sb 630 is a further expansion of John associated with the unexpanded role subject. Term entity.core 632 is an expansion of both John and subject. In this example, entity serves as a wildcard for any noun. Term see.relation 634 includes the unexpanded word and the unexpanded relationship or role. The next term is perceive.relation 636 which includes an expansion of the word see with the unexpanded role relation. The next term cat.ob 638, where ob stands for object, is a combination of an unexpanded word and an unexpanded role. The term cat.core 640 includes the unexpanded word cat with an expanded role core. Term feline.ob 642 includes an expanded word for cat, namely feline, and an unexpanded role. The next term feline.core 644 includes an expansion of the word cat and an expansion of the role. The next term animal.ob 646 includes a further expansion of the word cat and an unexpanded role. The next term animal.core 648 includes a further expansion of the word cat and an expansion of the role. The next term entity.ob 650 includes yet a further expansion of the word cat in association with an unexpanded role. The final term entity.core 652 includes an expanded word and an expanded relationship.

The first example query "who perceived something?" 610, may be broken down into three terms. The first term, is person.sb 612 which stands for subject. The word person is chosen because a person is sought in response to a query asking who. The next term is perceive.relation 614 and the final term is entity.ob 616. Thus, this query will match up with a sentence in which the person is the subject, the person perceives, and an entity is the object. As can be seen, term 612 is a match 670 with term 626 in the index. Term 614 is a match 672 with term 636 in the index, and term 616 is a match 674 with term 650 in the index. Thus, the document containing "John sees a cat" 620 would be matched in response to the query "who perceived something" 610.

The second example query, "who sees an animal?" 660 may be broken down into three unexpanded terms. The terms include person.sb 662, see.relation 664, and animal.ob 668. Term 662 forms a match 676 with term 626. Term 664 is a match 677 with term 634. Term 668 is a match 678 with term 646. Thus, the sentence "John sees a cat" 620 may be found by a very broad query "who perceived something" 610 as well as a more specific query "who sees an animal" 660 because the terms and relationships in the sentence 620 have been broadened or expanded so that they match a more general query. The more specific roles have also been kept so that a more specific query also finds a match.

In the embodiment illustrated by FIG. 6, both the words and roles associated with a sentence in a document are expanded, while the words and roles in the query are not expanded. In another embodiment, the roles in the query are expanded, while the roles from a sentence in a document are not expanded. This embodiment is illustrated by FIG. 7, which shows mapping a sentence without role expansion while expanding roles in the queries. The sentence "John stayed at work" 730, is used for the sake of illustration. Sentence 730 may be broken down into term John.sb 732, person.sb 734, entity.sb 735, be.relation 736, entity.at 738, and work.at 739. In this case, John is expanded to person and entity in one instance and work is expanded to entity. However, the roles are not expanded.

Example query "who was somewhere?" 710 may be broken down into three unexpanded terms. The unexpanded terms include person.sb 712, be.relation 714 and entity.at 718. Two additional terms are added with expanded roles and used to search the index. The first term with an expanded role is entity.away_from 716. The second term with an expanded role is entity.whr 720. As can be seen, term 712 is a match 760 with term 734, term 714 is a match 762 with term 736, and term 718 is a match 764 with term 738. Thus, the query "who was somewhere?" would find the sentence "John stayed at work."

The second example query, "where was John?" 740 may be broken down into terms John.sb 742, be.relation 744, entity.away_from 746, entity.at 748, and entity.whr 750. As can be seen, the relationships associated with entity have been expanded. Term 742 forms a match 770 with term 732, term 744 forms a match 772 with term 736 and term 748 forms a match 774 with term 738. Thus, the query "where was John?" 740 would find the sentence "John stayed at work."

FIGS. 6 and 7 illustrated expanding the roles in either the queries or the sentence from a document. In one embodiment, roles associated with words are expanded in both the queries and the sentence. This embodiment is illustrated in FIG. 8. Turning now to FIG. 8, an example of matching expanded queries to an expanded sentence is shown in accordance with an embodiment of the present invention. In FIG. 8, the roles associated with words in the query and the roles associated with words in the index sentence are both expanded. The sentence "John read at work" 820 is broken down into several terms. The terms include John.sb 822, John.core 824, person.sb 826, person.core 828, entity.sb 830, read.relation 832, work.at 834, work.whr 836, work.vague 838, entity.at 840, entity.whr 842, entity.vague 844, and entity.whn 846. As can be seen, the word John is expanded to person and entity and the word work is expanded to entity. Similarly, the role "subject" is expanded to "core" in association with John, and the role "at" is expanded to "where," "vague," and "when" in relation to work. The first query "reading during work" 810 may be broken down to terms read.relation 812, and work.during 814, which may be expanded to work.when 816. This query is not a match for the indexed sentence 820 because neither terms 814 nor 816 are found in the index terms associated with sentence 820. In this embodiment, all terms in the query must match a term in the index. However, in other embodiments less than all of the terms from a query may match terms in the index for a match to the document exist.

The second example query, "reading before work" 850 may be broken down into terms read.relation 852, work.before 854 and work.when 856. The sentence "John read at work" 820 would be returned in response to the second query 850 because the term 832 is a match with term 860. Similarly, the term 846 forms a match 862 with the term 856 in the query. Thus, in embodiments of the present invention roles may be expanded in the index, the query, or both.

Figure 9:
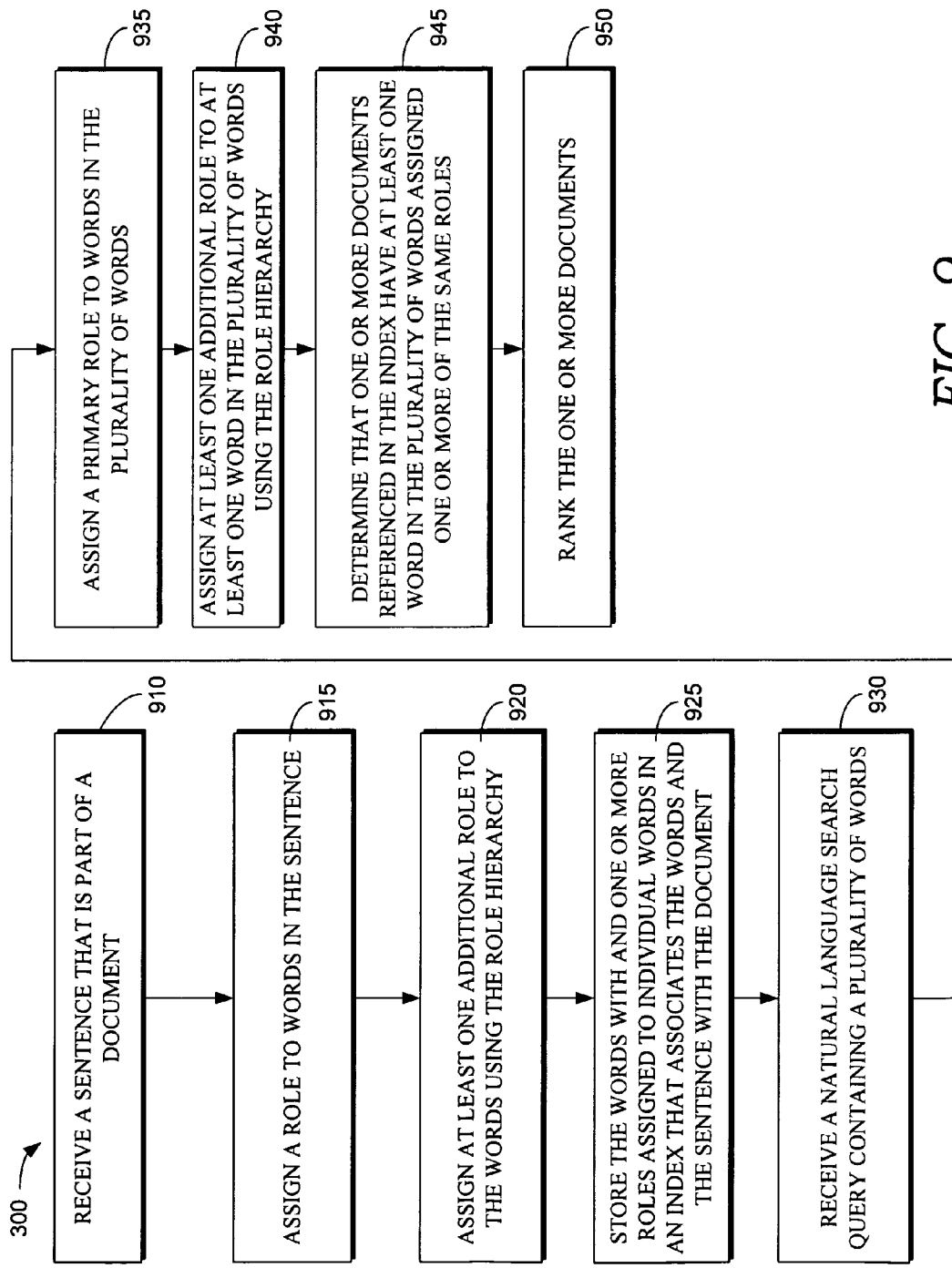
FIG. 9 is a flow chart illustrating a method of indexing document contents using a role hierarchy, in accordance with an embodiment of the present invention.

Turning now to FIG. 9, a flow chart illustrating a method of indexing document contents using a role hierarchy is shown in accordance with an embodiment of the present invention. At step 910, a sentence that is part of a document is received. At step 915, a role is assigned to words in the sentence. As explained previously, the type of role may be a semantic relationship between words. At step 920, at least one additional role is assigned to the words using the role hierarchy. The role hierarchy includes a hierarchy of roles including a root role that is general in at least one level of sub roles that are more specific than the root role. Thus, at lest one word from the sentence will be assigned at least two roles. A single role could be assigned to multiple words. As explained previously, the additional role is more general and is taken from a higher level on the role hierarchy.

At step 925, the words are stored with the one or more roles assigned to individual words. The words and roles are stored in an index that associates the words and the sentences with the document from which the sentence came. In one embodiment, the words may also be expanded in combination with the relationships. Expanding both the roles and the words can create a proliferation of terms to index. As described previously, a term is a combination of a word and a role assigned to the word. In one embodiment, the terms are stored with a single role in a single term. In another embodiment, the words are stored in a term including a word and the broadest role associated with the word and a payload of other relationships associated with the word that are more specific.

At step 930, a natural language search query containing a plurality of words is received. At step 935, a primary role is assigned to words in the plurality of words from the search query. At step 940, at least one additional role is assigned to at least one word in the plurality of words using the role hierarchy. At step 945, one or more documents, referenced in the index, are determined to have at least one word in the plurality of words assigned to one or more of the same roles. At step 950, the one or more documents are ranked. Documents with more matching words assigned to the same roles are given a higher rank. In addition, a higher rank is given when a word associated with a more specific role matches the same word with the same specific role in the index. The one or more documents that match the search query may be displayed in whole or in part to the user who submitted the search query.

The present invention has been described in relation to particular embodiments, which are intended in all respects to be illustrative rather than restrictive. Alternative embodiments will become apparent to those of ordinary skill-in-the-art to which the present invention pertains without departing from its scope.

From the foregoing, it will be seen that this invention is one well adapted to attain all the ends and objects set forth above, together with other advantages which are obvious and inherent to the system and method. It will be understood that certain features and sub-combinations are of utility and may be employed without reference to other features and sub-combinations. This is contemplated by and is within the scope of the claims.

The invention claimed is:

1. One or more computer-readable media having computer-executable instructions embodied thereon for performing a method of expanding and indexing relationships between words within a sentence, the method comprising:
   receiving a first electronic document having content that includes text;
   breaking the text into one or more sentences;
   determining a first grammatical role for a word in the sentence;
   determining that the word has more than one potential grammatical role;
   assigning a second grammatical role to the word, wherein the second grammatical role is a subservient grammatical role to the first grammatical role, which is a dominant grammatical role, wherein the subservient grammatical role fits within a definition of the dominant grammatical role and has a more specific definition; and storing the word with the first grammatical role and the second grammatical role in an index that associates the word and the sentence with the first electronic document, thereby allowing a search engine to match the first electronic document with a search query that includes similar words having similar roles.

2. The media of claim 1, wherein the method further comprises:

receiving the search query containing the word;

determining that the word is used in the first grammatical role within the search query;

determining that the word has more than one potential grammatical role within the search query; and assigning a third grammatical role to the word.

3. The media of claim 2, wherein the method further comprises:

searching the index to find one or more electronic documents having the word used in one or more of the first grammatical role and the third grammatical role;

determining the first electronic document is a first match to the search query;

determining a second electronic document having the word assigned to the first grammatical role and the third grammatical role is a second match to the search query; and ranking the second electronic document as a better match to the search query than the first electronic document because the second electronic document has the word in the same roles that are assigned to the word in the search query.

4. The media of claim 2, wherein the method further comprises:

determining that at least two documents associated with entries in the index contain the word associated with the first grammatical role or the third grammatical role; and assigning a higher ranking to documents that contain the word associated with more of the same roles assigned to the word in the search query.

5. The media of claim 1, wherein the second grammatical role is assigned using a role hierarchy, wherein the role hierarchy includes a hierarchy of grammatical roles including a root role that is general and at least one level of sub roles that are more specific than the root role.

6. The media of claim 1, wherein storing the word with the first grammatical role and the second grammatical role includes creating a first term in the index including the word and the first grammatical role and a second term in the index including the word and the second grammatical role.

7. The media of claim 1, wherein the first grammatical role is initiator and the second grammatical role includes one or more of effector and agent.

8. A method for matching a search query to text within a one or more documents comprising:

receiving a natural language search query containing a plurality of words;

assigning a primary grammatical role to a word in the search query;

assigning an additional grammatical role to the word from the search query using a role hierarchy that defines a grammatical relationship between the primary grammatical role and the additional grammatical role, wherein grammatical roles within the role hierarchy get more specific the further grammatical roles are from a root grammatical role, and wherein the additional grammatical role fits within a definition of the primary grammatical role and has a more specific definition, wherein the additional grammatical role is a subservient grammatical role to the primary grammatical role, which is a dominant grammatical role; and determining, at a computing device, that at least one document referenced in an index, which associates the word and a sentence within the at least one document with one or more grammatical roles, includes the word from the search query assigned to one or more of the primary grammatical role and the additional grammatical role.

9. The method of claim 8 further comprising presenting information describing the at least one document.

10. The method of claim 8, further comprising generating additional words to search the index by adding at least one of a synonym and a hypernym for one or more words in the search query to a list of search terms, wherein a search term includes a single word and an associated role, and wherein the synonym and the hypernym form search terms with the roles assigned to the one or more words for which the synonym and the hypernym are synonyms and hypernyms.

11. The method of claim 8, further comprising ranking the one or more documents, wherein a higher ranking is given when the word in the search query that is assigned more than one role has multiple roles in common with the word occurring in the index.

12. The method of claim 8, further comprising:

receiving a sentence that is part of a document;

assigning a primary role for words in the sentence;

assigning at least one additional role to at least one word in the sentence having the primary role using the role hierarchy; and storing the words in the sentence with the at least one role assigned to the words in the sentence in the index that associates the words in the sentence and the sentence with the document.

13. The method of claim 12, further comprising indexing the words and the roles in a term that includes a single word and an assigned role, wherein each term includes one word and one role.

14. The method of claim 8, wherein the primary role is when and the additional role is one or more of before, at, and after.

15. One or more computer-storage media having computer-executable instructions embodied thereon for performing a method of indexing document contents using a role hierarchy, the method comprising:

receiving a first electronic document having content that includes text;

identifying a sentence that is part of the first electronic document;

assigning a first grammatical role to a word in the sentence;

determining that the word has more than one potential grammatical role;

assigning at least a second grammatical role to the word using the role hierarchy, which includes a hierarchy of grammatical roles including a root role that is general and at least one level of sub roles that are more specific than the root role, wherein the second grammatical role is a subservient grammatical role to the first grammatical role, which is a dominant grammatical role, and fits within a definition of the dominant grammatical role and has a more specific definition; and storing the word with the first grammatical role and the second grammatical role in an index that associates the words and the sentence with the electronic document, thereby allowing a search engine to match the first electronic document with a search query that includes similar words having similar roles.

16. The media of claim 15, wherein storing the word and the roles includes generating a term that includes the word and an assigned role, wherein each term includes one word and one role.

17. The media of claim 15, wherein storing the word and the roles includes generating a term that includes the word and an assigned role, wherein each term includes one word and multiple roles.

18. The media of claim 15, wherein the method further comprises:
   receiving a natural language search query containing a plurality of words;
   assigning a primary grammatical role to the words in the plurality of words;
   assigning at least one additional grammatical role to at least one word in the plurality of words using the role hierarchy; and
   determining that one or more documents referenced in the index have at least one word in the plurality of words assigned one or more of the same roles.

19. The media of claim 18, wherein the method further comprises:
   ranking the one or more documents, wherein documents with more matching words and the roles are given a higher rank, and wherein more ranking points are given to a word in the plurality of words that is associated with multiple roles has more roles in common with an occurrence of the word in the index.

20. The media of claim 19, wherein the method further includes displaying the one or more documents according to a rank assigned to each of the one or more documents.

* * * * *